(12) United States Patent
Fadde

(10) Patent No.: US 9,978,287 B2
(45) Date of Patent: May 22, 2018

(54) SYSTEMS AND METHODS FOR IMPROVING TENNIS STROKE RECOGNITION

(71) Applicant: Peter Fadde, West Lafayette, IN (US)

(72) Inventor: Peter Fadde, West Lafayette, IN (US)

( * ) Notice: Subject to any disclaimer, the term of this patent is extended or adjusted under 35 U.S.C. 154(b) by 322 days.

(21) Appl. No.: 14/849,854

(22) Filed: Sep. 10, 2015

(65) Prior Publication Data
US 2016/0074737 A1    Mar. 17, 2016

Related U.S. Application Data

(60) Provisional application No. 62/049,636, filed on Sep. 12, 2014.

(51) Int. Cl.
| | |
|---|---|
| *G09B 5/00* | (2006.01) |
| *G09B 5/02* | (2006.01) |
| *G09B 19/00* | (2006.01) |
| *A63B 69/38* | (2006.01) |

(52) U.S. Cl.
CPC ............. *G09B 5/02* (2013.01); *A63B 69/38* (2013.01); *G09B 19/0038* (2013.01)

(58) Field of Classification Search
CPC . A63B 69/00; A63B 69/0002; A63B 69/0024; A63B 69/38; G09B 19/00; G09B 19/0038
See application file for complete search history.

(56) References Cited

U.S. PATENT DOCUMENTS

2013/0330693 A1\* 12/2013 Sada ................. G09B 5/06
434/236

OTHER PUBLICATIONS

Peter Jae Fadde, Thesis submitted to the faculty of Purdue University entitled "Interactive Video Training of Perceptual Decision Making in the Sport of Baseball", Dec. 2002. 189 pages.\*

\* cited by examiner

*Primary Examiner* — Lawrence Galka

(57) ABSTRACT

Certain embodiments relate to systems and methods for improving tennis stroke recognition that includes: outputting on an output device a video or animation of an opponent player executing a tennis stroke, a layout of the near court, and one or more tennis stroke indicators corresponding to different tennis strokes; detecting a first user gesture or voice utterance adjacent to the output device to select one of the tennis stroke indicators a user believes is executed by the opponent player; detecting a second user gesture adjacent to the output device identifying a location in the layout of the near court the user expects the ball to hit; and updating the output device to display an actual type of tennis stroke executed by the opponent player and an actual location in the layout of the near court the ball hits as a result of the actual tennis stroke executed by the opponent.

16 Claims, 5 Drawing Sheets

SYSTEMS AND METHODS FOR IMPROVING TENNIS STROKE RECOGNITION

CROSS-REFERENCE TO RELATED APPLICATIONS

This application claims the benefit of U.S. Provisional Application Ser. No. 62/049,636 filed Sep. 12, 2014, and is incorporated herein in its entirety.

FIELD OF THE DISCLOSURE

Embodiments of the disclosure generally relate to the sport of tennis, and more particularly to systems and methods for improving tennis stroke recognition.

STATEMENT REGARDING FEDERALLY SPONSORED RESEARCH

None

BACKGROUND

Many people participate in racquet sports such as tennis, squash, racquetball, etc. Regardless of whether those people are novices, recreational players, or professional athletes, for a large number of them there is a goal of improving their skills. Thus, there is a need to develop cost-effective and efficient means for helping them improve their skills, including their racquet strokes.

Recognizing an opponent's stroke and anticipating direction of the shot are also considered to be key aspects of high-level tennis play, but are not tested or trained by any current interactive video instruction. While a number of computer-based visual skills training programs, such as Visual Edge, are available to improve general visual skills such as dynamic tracking, visual acuity, and peripheral vision, these are not tennis specific.

Meanwhile, sport science research studies dating to 1965, but especially since the mid-1980s, have used film or video clips to test and to train (in a limited laboratory environment) tennis players' ability to recognize the type or direction of opponent strokes before the contact of racquet and ball. While these techniques have been used successfully in the science laboratory, however, a reliable and automated (not human operated) system has yet to be developed in a commercially viable way.

Based on the critical role and difficulty that recognizing a player's stroke has on an aspiring player's development, there is a need for new training tools to improve recognition of a tennis stroke. The present invention addresses this need.

SUMMARY

Some or all of the above needs and/or problems may be addressed by certain embodiments of the disclosure. Certain embodiments may include systems and methods for improving tennis stroke recognition. According to one embodiment of the disclosure, there is disclosed a system. The system may include at least one memory configured to store computer-executable instructions and at least one control device configured to access at least one memory and execute the computer-executable instructions. The instructions may be configured to display, on an output device of a computer: a video or animation of an opponent player executing a tennis stroke hitting a tennis ball from a far court to a near court, a graphical layout of the near court, and one or more tennis stroke indicators corresponding to different types of tennis strokes. The instructions may be further configured to detect a first user gesture or voice utterance adjacent to the output device selecting one of the one or more tennis stroke indicators corresponding to the type of tennis stoke that a user believes is executed by the opponent player in the video. The instructions may be further configured to detect a second user gesture adjacent to the output device identifying a location in the layout of the near court the user expects the tennis ball to hit as a result of the tennis stroke executed by the opponent player in the video. The instructions may be further configured to update the output device to display: an actual type of tennis stroke executed by the opponent player in the video and an actual location in the layout of the near court the tennis ball hits as a result of the actual type of tennis stroke executed by the opponent player in the video.

According to another embodiment of the disclosure, there is disclosed a method. The method may include outputting, by at least one control device, for display to an output device: a video or animation of an opponent player executing a tennis stroke hitting a tennis ball from a far court to a near court, a layout of the near court, and one or more tennis stroke indicators corresponding to different types of tennis strokes. The method may further include detecting, by the at least one control device, a first user gesture or voice utterance adjacent to the output device selecting a respective one of the tennis stroke indicators corresponding to the type of tennis stoke that a user believes is executed by the opponent player in the video. The method may also include detecting, by the at least one control device, a second user gesture adjacent to the output device identifying a location in the layout of the near court the user expects the tennis ball to hit as a result of the tennis stroke executed by the opponent player in the video. The method may also include updating, by the at least one control device, the output device to display: an actual type of tennis stroke executed by the opponent player in the video and an actual location in the layout of the near court the tennis ball hits as a result of the actual type of tennis stroke executed by the opponent player in the video.

Other embodiments, systems, methods, aspects, and features of the disclosure will become apparent to those skilled in the art from the following detailed description, the accompanying drawings, and the appended claims.

BRIEF DESCRIPTION OF THE DRAWINGS

The detailed description is set forth with reference to the accompanying drawings, which are not necessarily drawn to scale. The use of the same reference numbers in different figures indicates similar or identical items.

DETAILED DESCRIPTION

Figure 1:
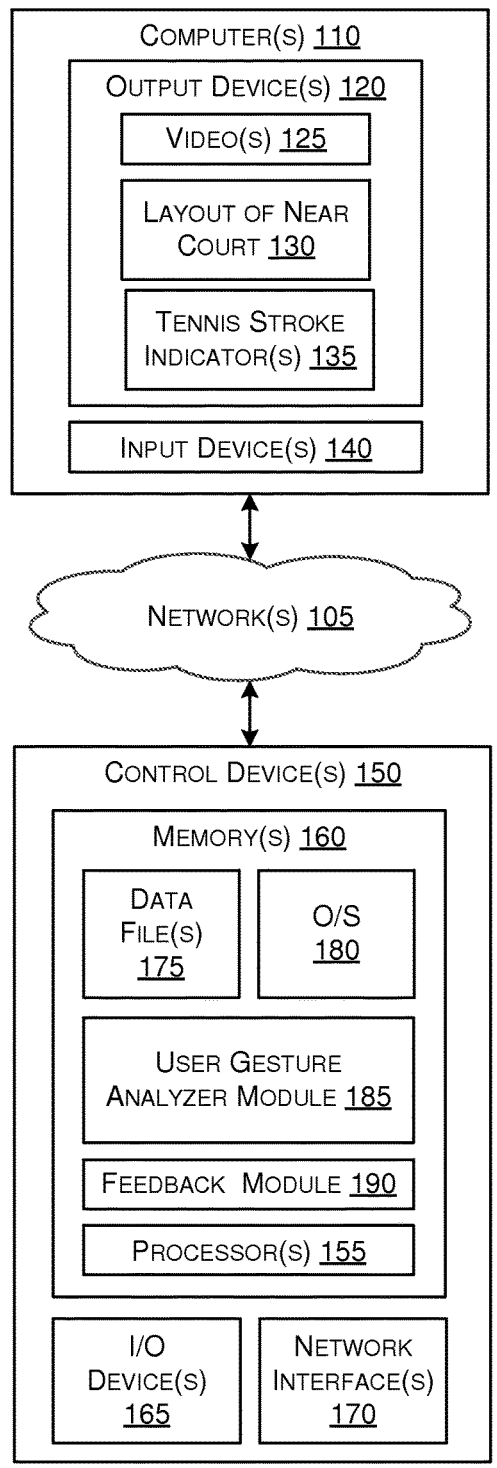
FIG. 1 illustrates an example system for improving tennis stroke recognition, according to an embodiment of the disclosure.

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

Certain embodiments disclosed herein relate to improving tennis stroke recognition using an interactive video program. In certain embodiments, a system may be provided that includes a control device that selects various match-play videos to display to a user on an output device. For example, in one embodiment, the output device may be configured to output a video to the user that shows an opponent player in a far court executing a type of tennis stroke that hits a tennis ball from the far court to a near court. Additionally, the output device may display a layout of the near court and one or more selectable tennis stroke indicators corresponding to different types of tennis strokes, such as, for example, a topspin stroke, a slice stroke, a drop stroke, a lob stroke, and the like. Upon viewing the video, the user may select, via a first user gesture, one of the tennis stroke indicators to identify the type of tennis stroke the user believes is executed by the opponent player in the video. Additionally, the user may identify, via a second user gesture, a location on the layout of the near court the user predicts the tennis ball to hit as a result of the tennis stroke executed by the opponent player in the video. Thereafter, the control device may be configured to update the output device to display the actual type of tennis stroke executed by the opponent player in the video and an actual location in the layout of the near court the tennis ball hits. In certain embodiments, the control device may determine whether the tennis stroke indicator selected by the user matches the actual type of tennis stroke executed by the opponent player in video, and assign the user one or more points if the user correctly identified the type of tennis stroke, which may be displayed to the user on the output device. Additionally, in certain embodiments, the output device may be updated to show the distance between the location in the layout of the near court the user predicted the tennis ball to hit and the actual location in the layout of the near court that the tennis ball hits as a result of the tennis stroke executed by the opponent player in the video.

In certain embodiments, the control device may be configured to determine whether the distance between the predicted location and the actual location is below a predefined threshold, and assign one or more additional points to the user, which may also be displayed on the output device. The technical effects associated with certain embodiments herein may include, but are not limited to, providing immediate feedback to a user to improve the user's ability to correctly identify different types of tennis strokes and anticipate where the tennis ball will hit in the near court as will be in greater detail herein below.

FIG. 1 depicts a block diagram of one example system 100 that facilitates improving tennis stroke recognition. According to an embodiment of the disclosure, the system 100 may include a computer 110 that includes an output device 120. As shown in FIG. 1, the output device 120 may be configured to display one or more videos 125 to a user.

For example, the one or more videos 125 may be displayed in a video region of the output device 120. In certain embodiments, the one or more videos 125 may include a video or animation depiction of an opponent player in a far court executing different types of tennis strokes, such as, for instance, a topspin stroke, a slice stroke, a drop stroke, a lob stroke and the like, to hit a tennis ball from the far court to a player in a near court. Additionally, the output device 120 may be configured to display a graphic layout of the near court 130 directly below the video region as well as one more selectable tennis stroke indicators 135, which may include text, colors, images, icons, and the like.

In certain embodiments, the one or more videos 125 include a video that simulates a player in the far court executing a tennis stroke as would be seen by a player standing in the near court. In one embodiment, the video may be edited to black before, at, or shortly after racquetball contact by the opponent player in the far court, thereby requiring the user to carefully review the opponent's set-up and striking motion in order to predict the type of tennis stroke and resulting location in the near court.

With continued reference to FIG. 1, the computer 110 may further include one or more input devices 140 configured to detect and/or capture user gestures adjacent to the output device 120. In certain embodiments, the input devices 140 may include a user gesture capturing device, such as, for instance, one or more cameras and/or ink pad controls disposed in close proximity to the output device 120. In certain embodiments, the input device 140 can include a gesture reader software module and/or a transparent ink pad user interface control. In any instance, the input devices 140 can be configured to detect user gestures adjacent to the output device 120 and communicate them in real-time or near real-time to a control device, such as, control device 150 in FIG. 1, via a network, such as, network 105 in FIG. 1. In certain embodiments, the control device 150 may be configured to receive and to analyze the user gestures from the input devices 140. In other embodiments, input may be made through voice recognition, where the one or more input devices 140 may be configured to detect voice utterances from a user. For instance, the input devices 140 may include a microphone, speakerphone or a throat mic that detects a word, a term, or even a sentence spoken by the user and communicates them in real-time to the control device 150 via network 105.

For example, in certain embodiments, after viewing one of the videos 125, a user may identify or otherwise select one of the tennis stroke indicators 135 by generating a first user gesture. For instance, the user may tap the screen of the output device 120 with a finger where one of the tennis stroke indicators 135 is displayed in order to indicate the type of tennis stroke that the user believes is executed by the opponent player in one of the video 125. As another example, the user may select one or the tennis stroke indicators 135 by verbally stating a particular type of tennis stroke, such as "topspin."

Additionally, in one embodiment, the user may generate a second user gesture using one or more fingers in order to identify a predicted location on the layout of the near court 130 the user expects the tennis ball to hit as a result of the tennis stroke executed by the opponent player in the video 125. Thereafter, the first and second user gestures may be communicated to the control device 150 via network 105.

Upon receiving the first and second user gestures, the control device 150 may be configured to update the output device 120 via network 105 to display the actual type of tennis stroke executed by the opponent player in one of the videos 125 as well as an actual location in the layout of the near court 130 the tennis balls hits as a result of the actual stroke executed by the opponent player in one of the videos 125. Additionally, the control device 150 may be configured to determine if the user correctly selected one of the tennis stroke indicator 135 corresponding to the actual type of tennis stroke executed by the opponent player in the video 125, calculate a distance between the predicted location in the layout of the near court 130 the user expected the tennis ball to hit and the actual location the tennis balls hits in the near court, and/or assign the user one or more points to display on the output device 120 via network 105 as will be described.

With continued reference to FIG. 1, the control device 150 may include any number of suitable computer processing components that may, among other things, analyze user gestures detected by the input devices 140. Examples of suitable processing devices that may be incorporated into the control device 150 include, but are not limited to, personal computers, server computers, application-specific circuits, microcontrollers, minicomputers, other computing devices, and the like. As such, the control device 150 may include any number of processors 155 that facilitate the execution of computer-readable instructions. By executing computer-readable instructions, the control device 150 may include or form a special purpose computer or particular machine that facilitates processing of user gestures in order to determine the accuracy of a user's ability to correctly identify different types of tennis strokes and a location in the layout of the near court the tennis ball hits as a result of the tennis stroke.

In addition to one or more processor(s) 155, the control device 150 may include one or more memory devices 160, one or more input/output ("I/O") interfaces 165, and/or one or more communications and/or network interfaces 170. The one or more memory devices 160 or memories may include any suitable memory devices, for example, caches, read-only memory devices, random access memory devices, magnetic storage devices, etc. The one or more memory devices 160 may store user gestures or other data, executable instructions, and/or various program modules utilized by the control device 150, for example, data files 175, an operating system ("OS") 180, a user gesture analyzer module 185 and/or a feedback module 190. The data files 175 may include any suitable data that facilitates the operation of the control device 150 including, but not limited to, information associated with one or more detected user gestures and/or information associated with one or more actions directed by the control device 150 based on detected user gestures. The OS 180 may include executable instructions and/or program modules that facilitate and/or control the general operation of the controller 150.

Additionally, the OS 180 may facilitate the execution of other software programs and/or program modules by the processors 155, such as, the user gesture analyzer module 185. The user gesture analyzer module 185 may be a suitable software module configured to analyze and/or process user gestures detected by the input devices 140. For instance, the user gesture analyzer module 185 may analyze user gestures detected by the input devices 140, which may be collected and stored in memory 160.

According to one embodiment, the control device 150 may be configured to detect a first user gesture via the one or more input devices 140. For instance, upon viewing one of the videos 125 displayed on the output device 120, a user may generate a first user gesture using one or more fingers in order to select, or otherwise identify, one of the tennis stroke indicators 135 corresponding to different types of tennis swings. To do so, in one embodiment, the user may tap the screen of the output device 120 with a finger where the corresponding tennis stroke indicator 135 is displayed in order to indicate the type of tennis swing the user believes to be executed by the opposing player in one of the videos 125. As another non-limiting example, the user may generate a finger stroke gesture on the screen of the output device 120 in order to identify the tennis stroke indicator 135 the user would like to select. As another non-limiting example, the user may verbalize a stroke indicator that would be accepted as input through voice recognition.

Continuing with the same example, after a first user gesture is generated, a second user gesture may be generated the user. According to one embodiment, the user may generate a second user gesture, such as, a finger tap gesture, using one or more fingers in order to identify a location on the layout of the near court 130 displayed on the output device 120 the user predicts the tennis ball to hit in the near court as a result of the stroke executed by the opponent player in one of the videos 125. To do so, in one embodiment, a user may tap a location on the layout of the near court 130 on the screen of the output device 120 with a finger.

Thereafter, the control device 150 may be configured to execute the user gesture analyzer module 185. The user gesture analyzer module 185 may be configured to analyze the first user gesture. For instance, the user gesture analyzer module 185 may be configured to associate a location of the first user gesture on the output device 120 to the location of one of the tennis stroke indicators 135 on the output device 120. Using this example, the user gesture analyzer module 185 may determine the particular tennis stroke indicator 135 the user would like to select, such as, the tennis stroke indicator 135 corresponding to a topspin stroke. Having identified the particular tennis stroke indicator 135 the user would like to select, in one embodiment, the user gesture analyzer module 185 may be configured to highlight the tennis stroke indicator 135 and/or wait to receive a second user gesture detected from the input device 140.

Similar to the first user gesture, the input device 140 may be configured to automatically, or in response to some other trigger, transmit to the control device 150 via network 105 the captured second user gesture and any other information associated with the second user gesture. Upon receiving the second user gesture, the control device 150 may be configured to execute the user gesture analyzer module 185. The user gesture analyzer module 185 may be configured to analyze the second user gesture. For instance, the user gesture analyzer module 185 may be configured to associate a location of the second user gesture on the output device 120 to the location on the layout of the near court 130 on the output device 120. Using this example, the user gesture analyzer module 185 may determine the particular location on the layout of the near court 130 the user believes the tennis ball to hit in the near court. Additionally, in one embodiment, the control device 150 may be configured to update the output device 120 via network 105 to display an indicator, such as, the letter "x," on the layout of the near court 130 to show where on the layout of the near court 130 the user generated the second user gesture on the output device 120.

Having identified the particular tennis stroke indicator 135 the user selected and a location in the layout of the near court 130, in one embodiment, the control device 150 may be configured to execute the feedback module 190. In certain embodiments, the feedback module 190 may be configured to update the output device 120 to display the actual type of tennis stroke executed by the opposing player in the video 125. For example, in one embodiment, the feedback module 190 may generate a control action and/or direct the communication from the control device 150 of an updated presentation of the tennis stroke indicators 135 to the computer 110 for display on the output device 120 that highlights the particular tennis stroke indicator 135 that corresponds to the actual type of tennis stroke executed by the opponent player in one of the videos 125. Additionally, or alternatively, in one embodiment, the feedback module 190 may generate a control action and/or direct the communication from the control device 150 of an updated presentation to the computer 110 that displays a feedback section showing the name of the type of tennis stroke executed by the opponent player one of the videos 125 viewed by the user.

Additionally, in one embodiment, the feedback module 190 may be configured to update the output device 120 to display an actual location on the layout of the near court 130 the tennis ball hits as a result of the actual tennis stroke executed by the opponent player in the video 125. For instance, the feedback module 190 may generate a control action and/or direct the communication from the control device 150 to facilitate an updated presentation of the layout of near court 130 to the computer 110 for display on the output device 120 that displays an indicator, such as the letter "y" to show the actual location on the layout of the near court 130 the tennis ball hits as a result of the actual tennis stroke executed by the opponent player in one of the videos 125.

Further, in certain embodiments, the feedback module 190 may be configured to update the output device 120 to display a distance between the location on the layout of the near court 130 the user predicted the tennis ball to hit (displayed as the letter "x") and the actual location on the layout of the near court 130 the tennis ball actually hit on the near court, thereby displaying the accuracy of the user's prediction. In certain embodiments, if the distance between the predicted location and the actual location is below a predefined threshold, then the user may be assigned one or more points, which may be displayed to the user on the output device 120. Similarly, in certain embodiments, if the tennis stroke indicator 135 selected by the user matches the actual type of tennis stroke executed by the opponent player in the video 125, then the feedback module 190 may be configured to assign the user one or more points, which may be displayed to the user on the output device 120. For instance, the feedback module 190 may generate a control action and/or direct the communication from the control device 150 to facilitate an updated presentation of a feedback section to the computer 110 that displays on the output device 120 that displays a number of points assigned to the user for correctly identifying the type of tennis stroke, as well as a total number of points the user has accumulated.

As desired, embodiments of the disclosure may include a system 100 with more or less than the components illustrated in FIG. 1. Additionally, certain components of the system 100 may be combined in various embodiments of the disclosure. The system 100 of FIG. 1 is provided by way of example only.

Figure 2:
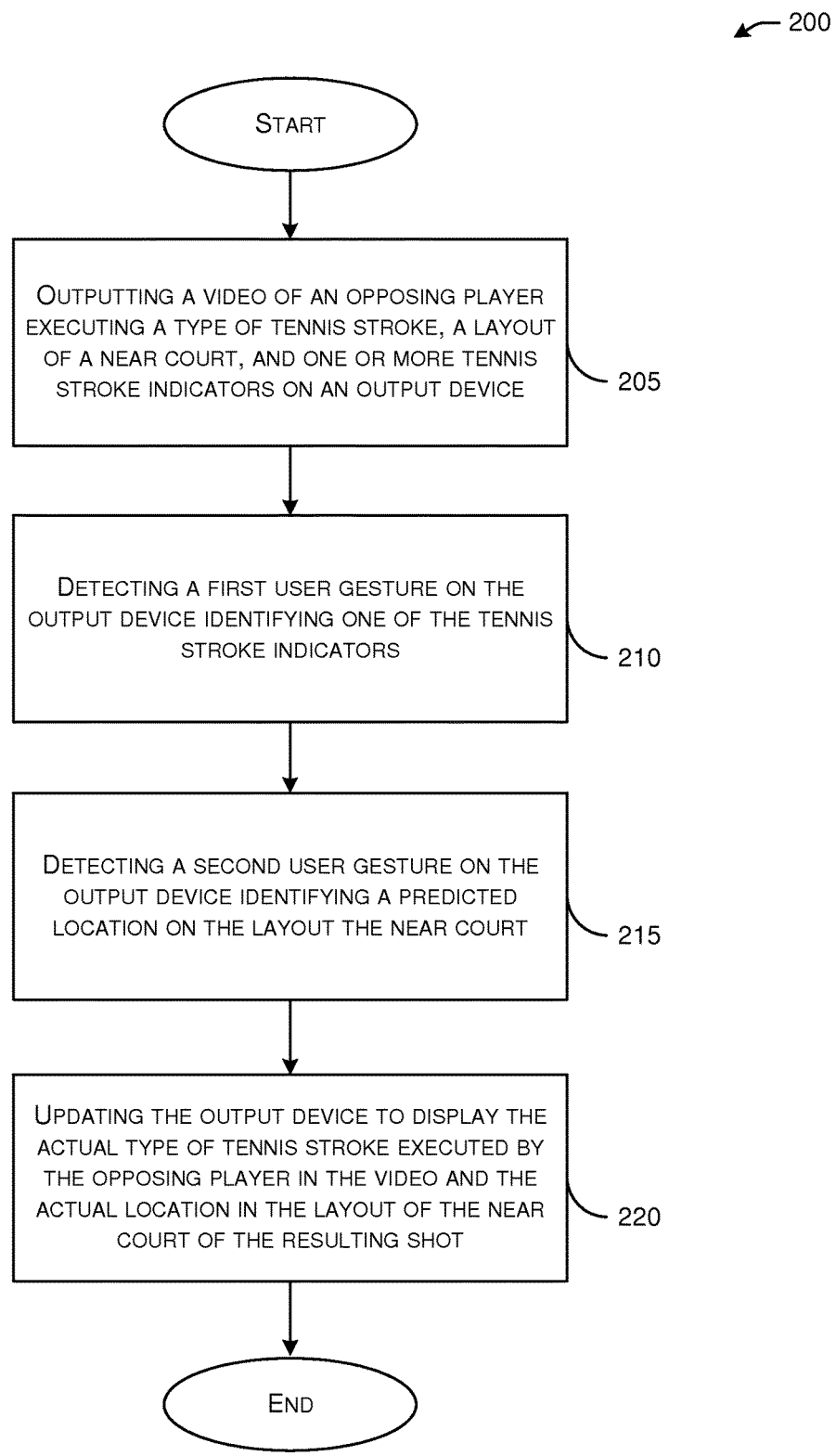
FIG. 2 is a flow diagram of an example method for improving tennis stroke recognition, according to an embodiment of the disclosure.

Referring now to FIG. 2, shown is a flow diagram of an example method 200 for improving tennis stroke recognition, according to an illustrative embodiment of the invention. The method 200 may be utilized in association with various systems, such as the system 100 illustrated in FIG. 1.

The method 200 may begin at block 205. At block 205, a control device, such as, 150 in FIG. 1, may output for display to an output device, such as output device 120 in FIG. 1, a video, such as video 125 in FIG. 1. As described above, the video may be of an opponent player executing a tennis stroke hitting a tennis ball from a far court to a near court. Additionally, the output device may display a layout of the near court, such as layout of near court 130 in FIG. 1 directly underneath the video, as well as one or more tennis stroke indicators corresponding to different types of tennis strokes, such as tennis stroke indicators 135 in FIG. 1.

Next, at block 210, a control device, such as 150 in FIG. 1, may detect a first user gesture adjacent to the output device, such as 120 in FIG. 1, of a computer, such as 110 in FIG. 1. In certain embodiments, the first user gesture may be analyzed by, for example, a user gesture analyzer module such as 185 in FIG. 1, in order to identify one of the tennis stroke indicators, such as 135 in FIG. 1, on the output device corresponding to the different types of tennis strokes that a user believes is executed by the opponent player in the video. In certain embodiments, the first user gesture may be detected by an input device, such as, input device 140 illustrated in FIG. 1. As described above, the first user gesture may include a finger-based gesture, such as, a finger stroke gesture, or a voice utterance that may be generated by a first user.

Next, at block 215, the control device 150 may detect, via the input device 140, a second user gesture adjacent to the output device 120 of the computer 110 identifying a predicted location on the layout of the near court the user expects the tennis ball to hit as a result of the stroke executed by the opponent player in the video.

Lastly, at block 220, the control device 150 may update the output device 120 to display an actual type of tennis stroke executed by the opponent play in the video and an actual location in the layout of the near court the tennis ball hits as a result of the stroke executed by the opponent player in the video.

The method 200 of FIG. 2 may optionally end following block 220.

The operations described and shown in the method 200 of FIG. 2 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 2 may be performed. As desired, the operations set forth in FIG. 2 may also be performed in a loop as a rotating machine is monitored. For example, the operations may be performed every twenty minutes.

Figure 3:
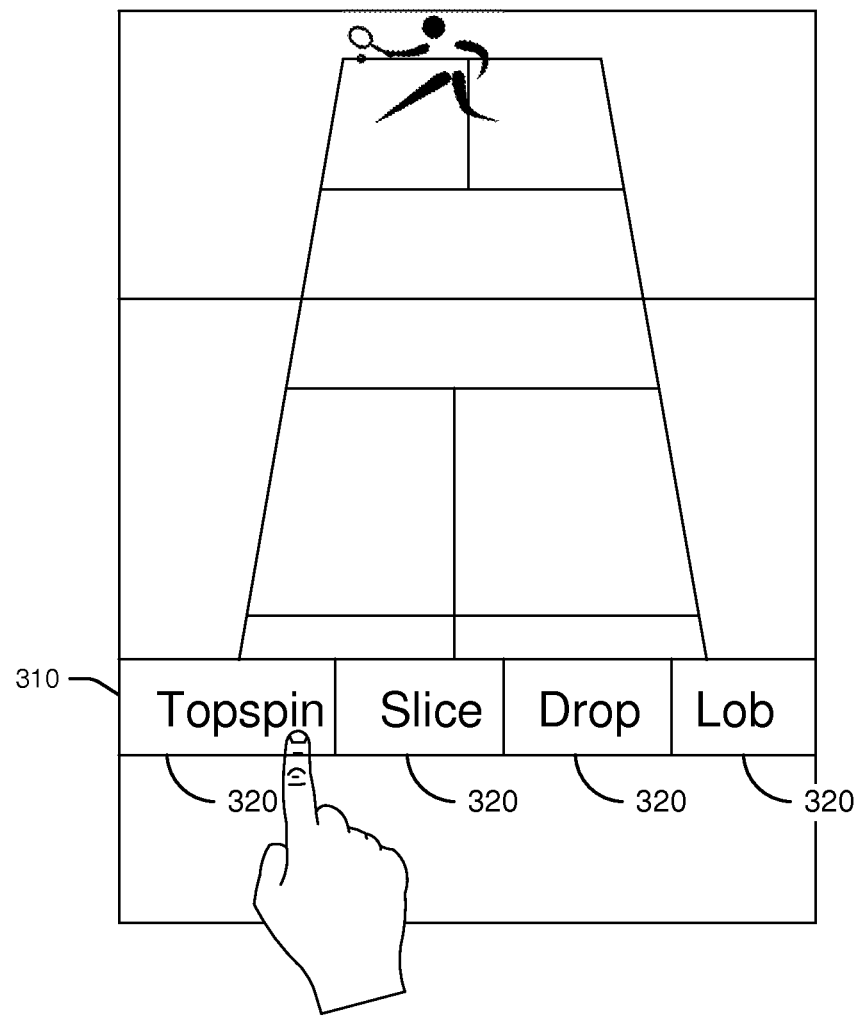
FIG. 3 is an example method for selecting a tennis stroke indicator based on user gestures, according to an embodiment of the disclosure.

Referring now to FIG. 3, shown is an example method for selecting a tennis stroke indicator based on a user gesture as described in block 210 of FIG. 2. As illustrated in FIG. 3, one or more tennis stroke indicators 320 corresponding to different types of tennis strokes may be displayed on an output device 310. A user may identify or otherwise select one of the tennis stroke indicators 320 by generating a first user gesture. For example, as shown in FIG. 3A a user may tap the screen of the output device 310 with a finger where one of the tennis stroke indicators 320 is displayed in order to select the particular tennis stoke indicator the user believes is executed by an opponent player in the video. In another embodiment, a user might make a voice utterance of the stroke indicator.

Figure 4:
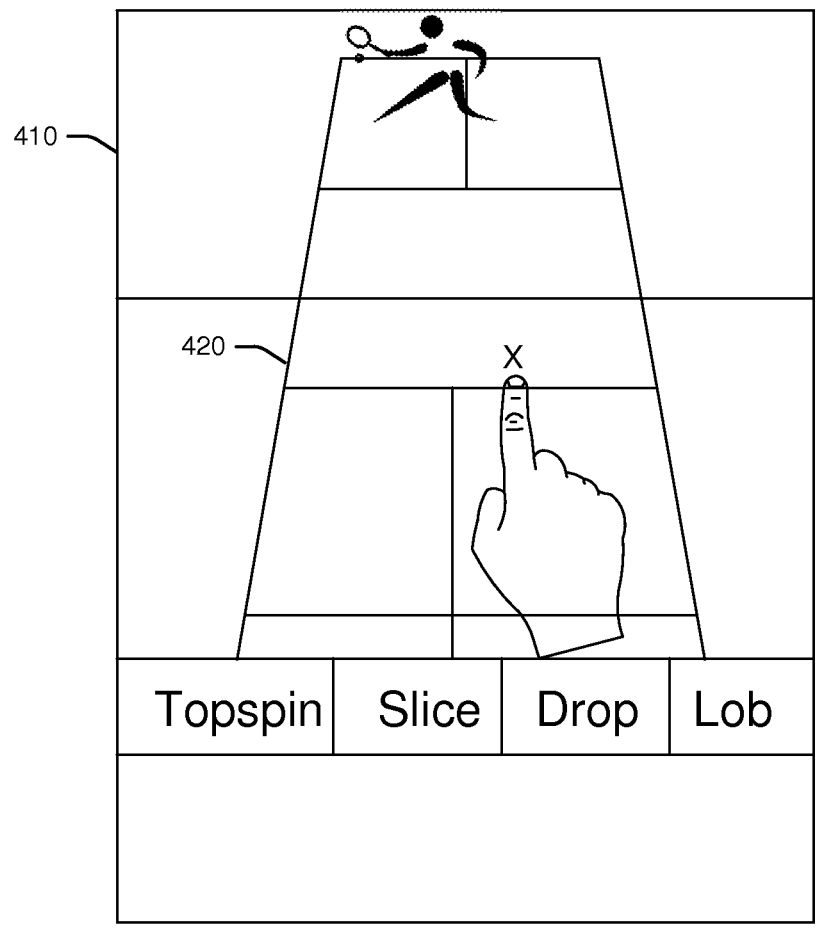
FIG. 4 is an example method for identifying a location in a layout of a near court based on user gestures, according to an embodiment of the disclosure.

Referring to FIG. 4, shown is an example method for identifying a location in a layout of a near court, such as 130 in FIG. 1, based on a user gesture as described in block 215 of FIG. 2. As shown in FIG. 4, a user may generate a second user gesture using one or more fingers in order to identify a location in the layout of the near court 420 displayed on an output device 410. For instance, as shown in FIG. 4, a user may tap a location on the screen of the output device 410 with a finger in order to indicate a predicted location in the layout of the near court 420 the user expects a tennis ball to hit in the near court as a result of the type of tennis stroke executed by an opponent player in a video. As shown in FIG. 4, an indicator, such as the letter "x", may be displayed where the user generated the second user gesture on the output device 410.

Figure 5:
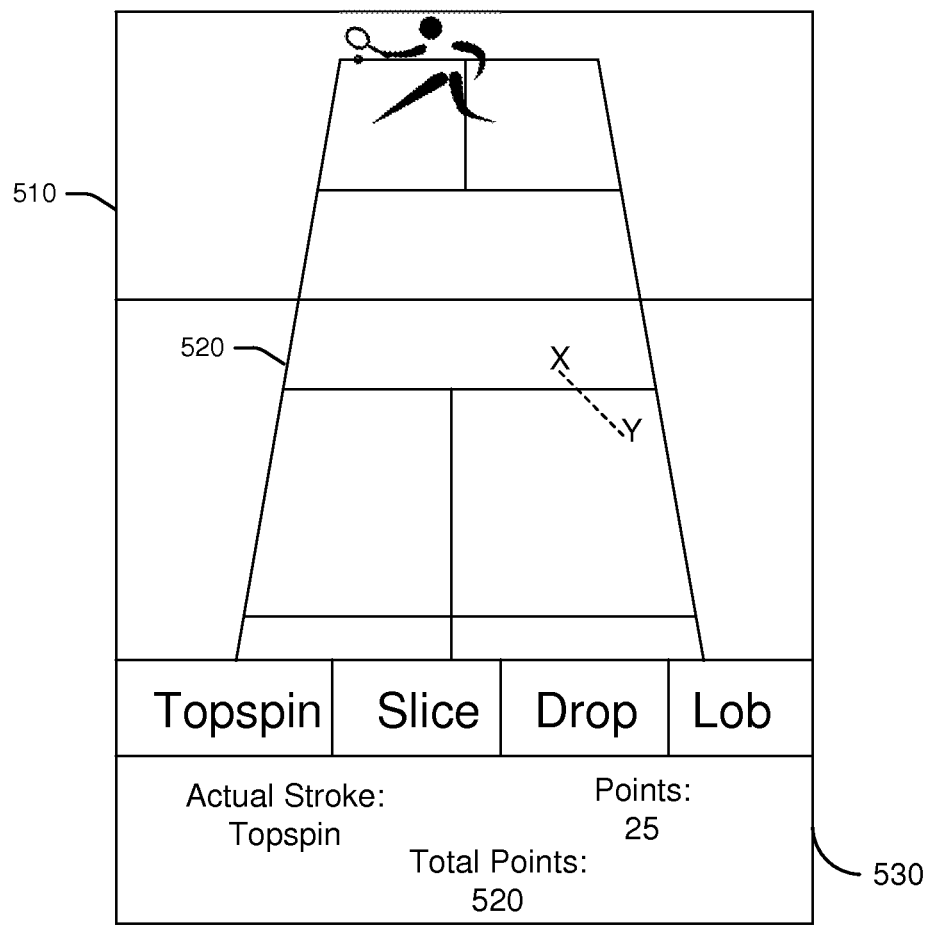
FIG. 5 is an example method for updating an output device to display an actual type of tennis stroke executed by an opponent player in a video and an actual location in the layout of the near court the tennis ball hits, according to an embodiment of the disclosure.

Referring now to FIG. 5, shown is an example method for updating an output device to display an actual type of tennis stroke executed by an opponent player in a video and an actual location in the layout of the near court the tennis ball hits as described in block 220 of FIG. 2. According to one embodiment, based upon the first and second user gesture, an updated presentation on an output device 510 may be displayed to one or more users. For instance, an indicator, such as the letter "y", may be displayed on the layout of the near court 520 to display the actual location a tennis ball hits in the near court as a result of the actual tennis stroke executed by the opponent player in a video. Additionally, the output device 510 may be updated to display a dotted line on the layout of the near court 520 to show the distance between the predicted location on the layout of the near court 520 the user expected the tennis ball to hit (displayed as the letter "x") and the actual location on the layout of the near court 520 the tennis ball actually hit, thereby showing the user the accuracy of their prediction. Further, in certain embodiments, the output device 510 may be updated to display a feedback section 530 that displays the actual type of tennis swing executed by the opponent player in the video, the number of points assigned to a user for correctly identifying the type of tennis swing, and/or a total number of cumulative points the user has been assigned.

The disclosure is described above with reference to block and flow diagrams of systems, methods, apparatus, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for improving tennis stroke recognition, the method comprising:
   outputting, by at least one control device, for display to an output device: (i) a video or animation of an opponent player executing a tennis stroke hitting a tennis ball from a far court to a near court, (ii) a layout of the near court, and (iii) one or more tennis stroke indicators corresponding to one or more types of tennis strokes;
   detecting, by the at least one control device, a voice utterance or first user gesture adjacent to the output device to select a respective one of the one or more tennis stroke indicators corresponding to the type of tennis stoke that a user believes is executed by the opponent player in the video;

detecting, by the at least one control device, a second user gesture adjacent to the output device identifying a predicted location in the layout of the near court the user expects the tennis ball to hit in the near court as a result of the stroke executed by the opponent player in the video;

updating, by the at least one control device, the output device to display: (i) an actual type of tennis stroke executed by the opponent player in the video and (i) an actual location in the layout of the near court the tennis ball hits in the near court as a result of the actual type of tennis stroke executed by the opponent player in the video;

calculating, by the at least one control device, a distance between the predicted location in the near court the user expects the tennis ball to hit in the near court identified via the second user gesture and the actual location in the layout of the near court the tennis ball hits in the near court as a result of the actual tennis stroke executed by the opponent player in the video;

determining, by the at least one control device, that the distance is below a predefined threshold;

assigning, by the at least one control device, one or more points to the user; and updating, by the at least one control device, the output device to display the one or more user points.

2. The method of claim 1, further comprising:

determining, by the at least one control device, that the respective one of the one or more tennis stroke indicators selected by the user via the first user gesture matches the actual type of tennis stroke executed by the opponent player in the video;

assigning, by the at least one control device, one or more points to the user; and updating, by the at least one control device, the output device to display the one or more user points.

3. The method of claim 1, wherein the one or more tennis stroke indicators comprise: (i) a topspin stroke, (ii) a slice stroke, (iii) a drop stroke, or (iv) a lob stroke.

4. The method of claim 1, wherein the first user gesture and the second user gesture is generated by the user in response to viewing the video.

5. The method of claim 1, wherein the first user gesture or the second user gesture is a finger stroke gesture.

6. The method of claim 1, wherein the first user gesture or the second user gesture is a finger tap gesture.

7. The method of claim 1, wherein the first user gesture or the second user gesture is detected by the at least one control device via an input device disposed in close proximity to the output device.

8. The method of claim 7, wherein the input device comprises at least one of: a camera, a gesture reader, or a transparent ink pad control.

9. A system for improving tennis stroke recognition, the system comprising:

an input unit configured to detect at least one of a first user gesture or a second user gesture on an output device of a computer; and at least one control device in communication with the input unit that is configured to:

output for display to the output device: (i) a video of an opponent player executing a tennis stroke hitting a tennis ball from a far court to a near court, (ii) a layout of the near court, and (iii) one or more tennis stroke indicators corresponding to one or more types of tennis strokes;

detect a first user gesture adjacent to the output device to select a respective one of the one or more tennis stroke indicators corresponding to a type of tennis stoke that a user believes is executed by the opponent player in the video;

detect a second user gesture adjacent to the output device identifying a predicted location in the layout of the near court the user expects the tennis ball to hit in the near court as a result of the stroke executed by the opponent player in the video;

update the output device to display: (i) an actual type of tennis stroke executed by the opponent player in the video and (i) an actual location in the layout of the near court the tennis ball hits in the near court as a result of the actual stroke executed by the opponent player in the video;

calculate a distance between the predicted location in the near court the user expects the tennis ball to hit in the near court and the actual location in the layout of the near court the tennis ball hits as a result of the actual type of tennis stroke executed by the opponent player in the video;

determine that the distance is below a predefined threshold;

assign one or more points to the user; and update the output device to display the one or more user points.

10. The system of claim 9, wherein the at least one control device is further configured to:

determine the respective one of the one or more tennis stroke indicators selected by the user via the first user gesture matches the actual type of tennis stroke executed by the opponent player in the video;

assign one or more points to the user; and update the output device to display the one or more user points.

11. The system of claim 9, wherein the one or more tennis stroke indicators comprise: (i) a topspin stroke, (ii) a slide stroke, (iii) a drop stroke, or (iv) a lob stroke.

12. The system of claim 9, wherein the first user gesture and the second user gesture is generated by the user in response to viewing the video.

13. The system of claim 9, wherein the first user gesture or the second user gesture is a finger stroke gesture.

14. The system of claim 9, wherein the first user gesture or the second user gesture is a finger tap gesture.

15. The system of claim 9, wherein the first user gesture or the second user gesture is detected by the at least one control device via the input device disposed in close proximity to the output device.

16. The system of claim 9, wherein the input device comprises at least one of:

a camera, a gesture reader, or a transparent ink pad control.

* * * * *